Dec. 14, 1937.  M. M. KINLEY  2,102,080
WELL SURVEYING DEVICE
Filed Dec. 23, 1935   2 Sheets-Sheet 1
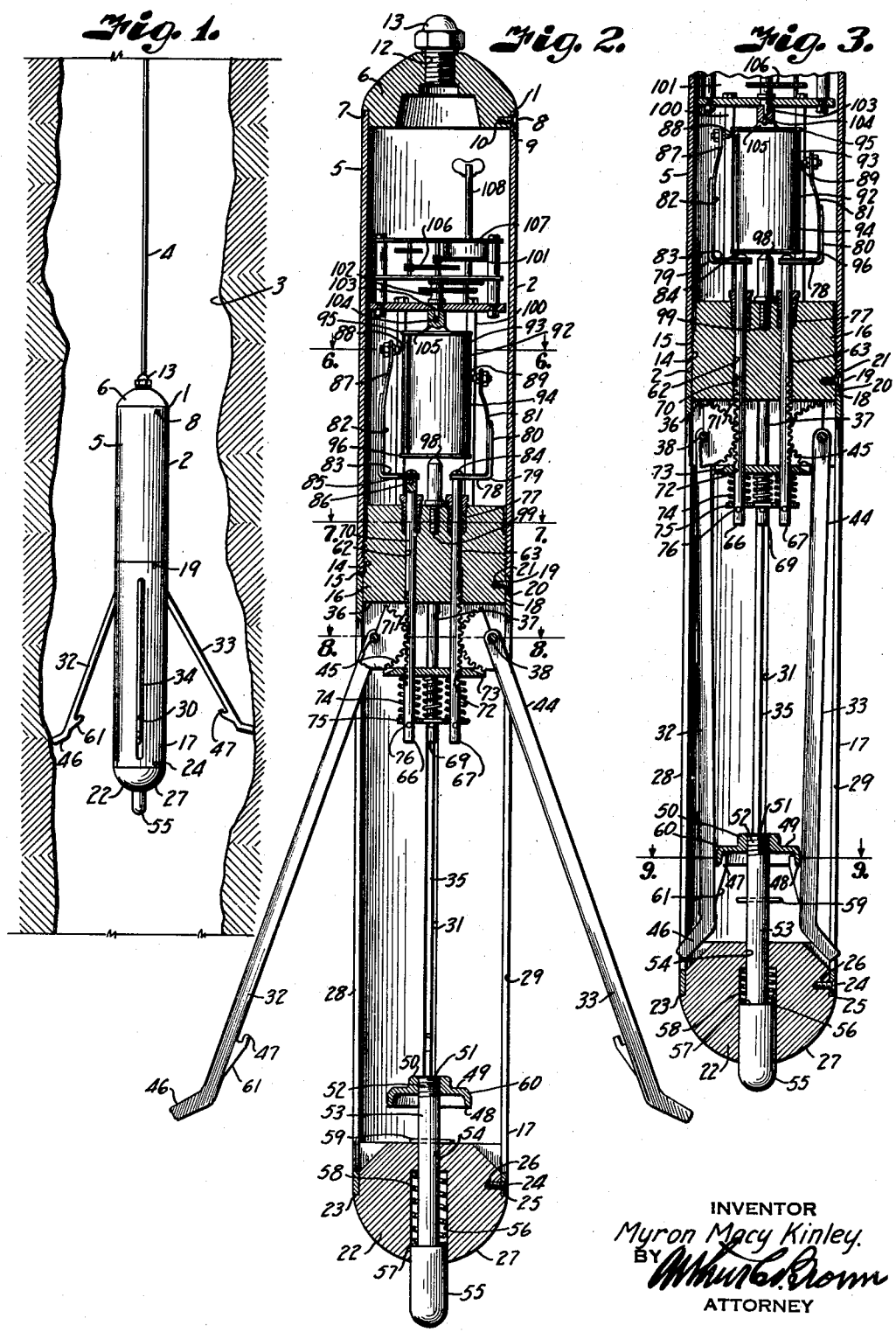
INVENTOR
Myron Macy Kinley,
BY
ATTORNEY Dec. 14, 1937.    M. M. KINLEY    2,102,080
WELL SURVEYING DEVICE
Filed Dec. 23, 1935    2 Sheets-Sheet 2
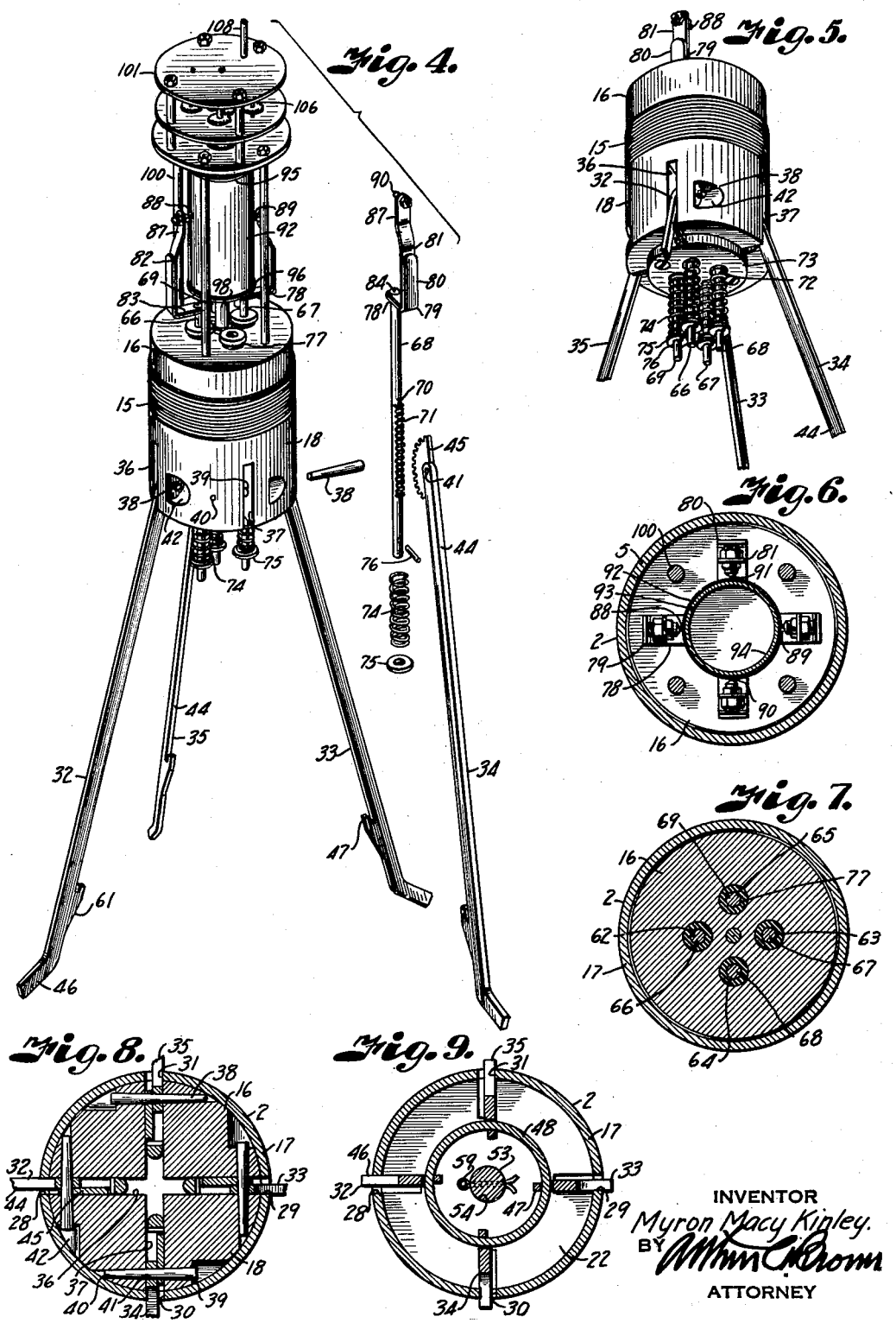
INVENTOR
Myron Macy Kinley.
BY
ATTORNEY Patented Dec. 14, 1937

2,102,080

UNITED STATES PATENT OFFICE 2,102,080

WELL SURVEYING DEVICE

Myron Macy Kinley, Tulsa, Okla.

Application December 23, 1935, Serial No. 55,854

8 Claims. (Cl. 33—174)

This invention relates to a surveying device particularly adapted for use in determining size and shape of a well or similar bore hole, and has for its principal object to provide a device of this character equipped for mechanically producing graphs of the well surfaces.

It is also an important object of the invention to provide for simultaneously recording graphs of opposite transverse diametrical sides of a well, whereby the effective cross sectional area may be ascertained through the portion of the well surveyed. Other objects of the invention are to provide a simple and compact apparatus wherein the working parts are not affected by well fluids or pressures, and to provide means for latching the measuring or calipering mechanism in retractive position when the device is run into the well, and means for automatically releasing the measuring mechanism after the device has reached the bottom of the well.

In accomplishing these and other objects of the invention, as hereinafter pointed out, I have provided improved details of structure, the preferred form of which is illustrated in the accompanying drawings wherein:

Fig. 1 is a cross sectional view through a portion of a bore hole illustrating operation of my improved surveying device for recording any irregular contour of the bore surfaces, such as cavities, projections and the like.

Fig. 2 is an enlarged vertical section through the surveying device particularly illustrating the calipering and recording mechanisms, and showing the caliper or feeler arms in extended position for following the surfaces of a well as the device is being moved through the well.

Fig. 3 is a similar section through the lower portion of the device showing the feeler or caliper arms in retracted and latched position as when the device is being lowered into a well preparatory to the recording operation.

Fig. 4 is a detailed perspective view of the measuring and recording mechanisms removed from the casing, and showing the parts composing one of the measuring mechanisms in disconnected spaced relation.

Fig. 5 is a detail perspective view particularly illustrating the spring elements for retaining the feeler or caliper arms in measuring position.

Fig. 6 is a cross section on the line 6—6 of Fig. 2, particularly illustrating the grouping of the styluses of the respective measuring mechanisms about the recording drum.

Fig. 7 is a cross section on the line 7—7 of Fig. 2, particularly illustrating the method of packing the stylus operating rods to prevent entrance of well fluid into the recording compartment.

Fig. 8 is a cross section on the line 8—8 of Fig. 2, illustrating journal mounting of the feeler arms.

Fig. 9 is a cross section on the line 9—9 of Fig. 3 illustrating the latch mechanism for retaining the feeler arms in contracted position within the casing.

Referring more in detail to the drawings:

1 designates a surveying device constructed in accordance with the present invention and which includes a casing 2 of suitable diameter to be freely lowered and withdrawn from a well hole 3, by means of a cable 4. The casing 2 is shown as including a tubular section 5 closed at its upper end by a plug 6, the plug 6 having an annular shouldered portion 7 inset into the upper end of the section and secured by means of suitable fastening devices, such as screws 8, that are threaded through suitable openings 9 in the tubular sections, and into threaded sockets 10 formed in the plug 6. The upper portion of the plug is of rounded contour 11, and has an internally threaded opening 12 for mounting a line connector or swivel 13 for the line 4. The shouldered joint, between the plug and the upper end of the tubular section, is fluid tight to prevent entrance of well fluids therethrough as the device is lowered into the well. The lower end of the tubular section is internally threaded, as at 14, for engaging the threaded neck 15 of a coupling block 16 that is connected in a lower tubular section 17 of the casing 2.

The lower section 17 conforms in diameter to the upper section 5, and has its upper end fluidtightly engaging the cylindrical portion 18 of the coupling 16, and is rigidly retained thereon by fastening devices, such as screws 19, threaded through suitable openings 20 in the casing, and into threaded sockets 21 formed in the periphery of the coupling block.

The bottom end of the lower section 17 is closed by a plug 22, having a shouldered portion 23 inset into the end thereof and retained by screws 24 extended through openings 25 and into threaded sockets 26 in the body portion of the plug. The depending end of the plug is rounded, as at 27, to guide the casing over obstructing portions in the surface of the well as the device is being lowered therein, as later described.

The side wall of the section 17 is provided, at opposite transverse diametrical points, with pairs of opposed longitudinal slots 28—29 and 30—31, through which pairs of caliper arms 32—33 and 34—35 are adapted to move into and out of the casing, as now to be described.

Formed in the lower end of the coupling block 16, in alignment with the respective pairs of slots, are transverse grooves 36 and 37 in which the fulcrumed ends of the respective feeler arms are journaled on pins 38. The pins 38 are preferably tapered, as shown in Fig. 8, and extend through aligning tapered openings 39 and 40 adjacent the ends of the slots and through bearing openings 41 in the feeler arms. The portions of the coupling plug adjacent the openings 39 are preferably recessed, as at 42, to facilitate insertion and removal of the pins.

Each feeler arm preferably includes a flat bar 44, having a substantially semi-circular gear segment 45 fixed to the fulcrum end thereof in axial alignment with the bearing opening 41 therein. The opposite end of the bar 44 terminates in an angularly extended foot 46 adapted to contact the inner surface of the bore hole. Formed on the bar 44 above the foot 46 thereof, and extended in the direction of the gear segment 45, is a latch finger 47 adapted to engage under an annular latching flange 48 of a keeper disk 49.

The keeper disk 49 has a central boss 50 provided with an internally threaded opening 51 for engaging the upper threaded end 52 of a plunger 53 that is reciprocably mounted in an axial bore 54 of the bottom plug 22. The lower end of the plunger has a head 55 that is slidable into a counter bore 56 opening upwardly from the rounded end of the plug. Mounted within the counter bore and having one end engaging against a shoulder 57, formed by the head 55, and having its opposite end bearing against the bottom of the counter bore, is a coil spring 58 for normally retaining the head 55 projecting from the block 22, the stem portion of the plunger being provided with a cotter pin 59 to engage against the inner end of the plug for limiting projection of the plunger against action of the spring 58.

When the plunger is in projected position, the latching flange 48 normally lies below the latch fingers 47 when the feeler arms are in retracted position, therefore when the feeler arms are to be latchingly retained within the casing, the plunger is moved upwardly within the casing, against action of the spring, to cause the upper peripheral edge 60 of the latch disk to ride against the cam surfaces 61 of the feeler arms to move them outwardly and permit free passage of the keeper disk. Upon clearance of the latch flange 48 with the latch fingers, contracting pressure applied to the feeler arms will cause them to pass under the flange so that upon release of the plunger 53, the spring 58 will effect movement of the keeper disk into latching engagement with the fingers 47 for holding the lower ends of the feeler arms within the housing.

The feeler arms are, however, constantly urged to projected position so that when released by the keeper disk they will spring outwardly into contact with the wall surfaces of the well as presently described.

Formed in the coupling block, in alignment with each of the transverse grooves, are vertical pairs of bearing openings 62—63 and 64—65 for slidably mounting reciprocatory members 66—67 and 68—69 respectively, each of which includes a cylindrical rod 70 having rack teeth 71 engaging the teeth of the gear segments 45. The lower ends of the shafts project through aligning openings 72 in a disk 73 that engages against the bottom face of the coupling block in bridging relation to the respective grooves. Sleeved on the ends of the rods projecting from the disk 73, are coil springs 74 having one of their ends bearing against the disk, and their opposite ends against washers 75 that are retained on the ends of the rods by transverse pins 76.

It is thus apparent that the springs 74 normally retain the rods at the lower end of their stroke and the feeler arms in their furthest extended position, but as the feeler arms are moved inwardly toward the casing, the tooth connections raise the rods against action of the springs.

The upper ends of the rods project through suitable packing glands 77 sealing the upper ends of the bearing openings, as best shown in Figs. 2 and 7, against entrance of any well fluids that may tend to pass into the recording compartment.

Fixed on the upper end of each shaft is a radially extending leg 78 of an angle shaped bracket 79, having a vertical leg 80 for backing stylus arms 81. The stylus arms 81 are preferably formed of spring material, and have vertical portions 82 fixed to the vertical legs of the brackets, and laterally extending foot portions 83 engaging the upper faces of the radial legs 78. The stylus arms and brackets just described, are fixed to the upper ends of the rods by screws 84 extending through suitable openings 85 in the brackets, and into threaded sockets 86 formed in the ends of the rods. The portions 87 of the respective stylus arms that project above the vertical legs 80 are of differential length, so that the styluses 88, 89, 90 and 91, carried by the respective brackets, are positioned at different levels relatively to the width of a record chart 92 that is applied to a recording drum 93.

The recording drum includes a cylinder 94, having flanged ends 95 and 96 to engage and support the edges of the recording chart 92, and its lower end is mounted on a point bearing 98 that is threaded into the upper end of the coupling block, as indicated at 99. Supported above the recording drum, on posts 100, is a motor 101, having a driving shaft 102 provided with a tongue 103 that engages in a slot 104 in a hub 105, formed on the upper end of the drum. The motor 101 includes suitable gearing and governing mechanism, indicated at 106, that is actuated by spiral spring 107 wound by a suitable key 108.

In preparing the device for use, the upper casing section is removed from the coupling block to expose the motor and recording drum. A chart 92 is then inserted over the drum by raising the styluses from the surface thereof. After the chart has been applied, the spring tension of the stylus arms will return the stylus points into contact with the chart. The feeler arms will then be moved inwardly through their respective slots and temporarily retained by placing the hand over the lower ends of the slots, so as to engage the foot portions thereof and hold them within the casing. The plunger 53 is then moved upwardly against tension of the spring 58, whereupon the keeper disk will cause the arms to move outwardly a sufficient distance to clear the latch engaging flange with the latch fingers. Immediately upon clearance of the disk, and upon release of the plunger, the keeper flange will be moved into engagement with the latch fingers by action of the coil spring, as shown in Fig. 3, to retain the arms in latched position against tension of their springs 74.

When in this position the stylus rods are raised to their upper movement of travel, as shown in Fig. 3. The key 108 is then operated to wind the spring of the motor, after which the upper casing section is reapplied to the coupling block and the device is lowered into the well. When the device reaches the bottom of the well the plunger 53 will engage therewith, but the weight of the device is sufficient to cause the casing to move downwardly over the plunger a sufficient distance to allow release of the latch fingers with the keeper flange. The arms are then released so that the springs 74 cause downward movement of the stylus rods to effect movement of the foot portions of the arms into engagement with the wall of the well.

The device is then lifted from the bottom of the well, whereupon the foot portions of the arms will follow the surface irregularities to effect movement of the styluses relatively to the recording chart, which produces a plurality of graphs thereon in exact conformity to the movement of the respective feeler arms.

Each arm, being adapted to independent movement relative to the other, does not interfere with the record being made by the other arms. The casing will also remain suspended in the axis of the bore hole during the entire upper movement thereof, and the graphs recorded on the chart will show the relative movement of the respective arms to and from the axis of the well hole.

When the device reaches the top of the well, the upper section is again uncoupled from the coupling block to allow removal of the chart from the drum. Upon analysis of the respective graphs that have been recorded on the chart, the relative diameters and shape of the well hole may be readily ascertained.

What I claim and desire to secure by Letters Patent is:

1. In a surveying device for recording surface irregularities of a bore hole, a casing, a plurality of feelers normally yieldingly retained in the casing, independent means for pivotally mounting said feelers for independent movement in the casing in radial planes extending through the axis of the bore hole, means normally retaining the feelers in latched engagement within the casing, means for releasing said feelers for engagement with surface irregularities of the bore hole, and mechanism connected with said feelers for recording variations in movements of the feelers over said surface irregularities.

2. In a measuring and recording device for bore holes, a body, paired independently journaled arms respectively carried at opposite diametrical sides of the body, means for imparting independent movement to said arms radially of the body, means normally latching the arms in the body, means for releasing said arms for contact with the surface of a bore hole, and mechanism in the body and connected with said arms for recording variations in movement of said arms.

3. In a measuring and recording device for bore holes, feeler arms journaled in the device and having independent movement responsive to surface irregularities of a bore hole, a drum rotatably supported in the device for mounting a record chart, a motor for actuating the drum, a stylus connected with each of the feeler arms and contacting the chart for drawing graphs on said chart responsive to movement of said feeler arms, means for latching the feeler arms in retracted position, and means for releasing said latching means to free the feeler arms.

4. In a surveying device for recording the surface irregularities of a bore hole, a body, a plurality of feelers normally yieldingly retained by the body and having latch engaging fingers thereon, a plunger reciprocably mounted in the body, latch means on said plunger for engaging said fingers, a spring normally retaining the plunger with the latch means in engagement with said fingers, and a head on the plunger adapted to be engaged by the bottom of the bore hole for effecting release of the feelers.

5. In a measuring and recording device for bore holes, a casing, feeler arms journaled in the casing and having independent movement responsive to surface irregularities in a bore hole, gear segments connected with the feeler arms, shafts having teeth meshing with the gear segments, means yieldingly urging the shafts in one direction to retain the feeler arms against said surface irregularities, and styluses connected with the respective shafts and adapted for contacting a chart for drawing graphs on said chart responsive to movement of said feeler arms whereby the graphs represent true traces of the irregular surfaces contacted by the respective feeler arms and from which the shape of the bore hole is determined.

6. In a surveying device for recording surface irregularities of a bore hole, a plurality of feeler arms, a casing for the feeler arms, means pivotally connecting one end of the respective arms on opposite diametrical sides of the casing whereby said arms are adapted to swing laterally of the casing to bring the opposite ends of the arms in contact with the surface irregularities of the bore hole, means independently and yieldingly connected with the pivoted ends of said arms for yieldingly retaining said other ends of the arms in contact with the bore hole, and recording mechanism located in the casing and having connection with said independently and yieldingly connected means for independently exhibiting variations in movements of said arms whereby the records made by said recording mechanism are comparable one with the other to determine the shape of the bore hole.

7. In a measuring and recording device for bore holes, a casing including an upper section and a lower slotted section, a coupling block connecting said sections, pairs of feeler arms, means for independently journalling the feeler arms in said block for movement through said slots of the lower section in accordance with surface irregularities in a bore hole and whereby said arms freely follow surface irregularities of the bore hole, a drum rotatably supported in the upper section for mounting a record chart, a motor for actuating the drum, toothed rods slidable through said coupling block, gear segments meshing with the teeth of the rods and having connection with the feeler arms, and a stylus mounted on each rod and contacting the chart for drawing graphs on said chart responsive to movement of said feeler arms.

8. In a measuring and recording device for bore holes, a casing having slots, a plurality of feeler arms having their upper ends journalled in the casing and independently movable through the respective slots so that the opposite ends of said arms are brought into contact with the surface irregularities of a bore hole, means supporting a record chart in the casing, means for progressively moving the chart, and styluses operatively connected with the respective feeler arms for contacting areas of the chart for drawing independent graphs on said chart responsive to movement of said feeler arms from which the size and shape of the bore hole is determined.

MYRON MACY KINLEY.